April 4, 1939.　　　H. R. CRANE　　　2,152,636
ROD COUPLING ASSEMBLY
Filed Jan. 9, 1937
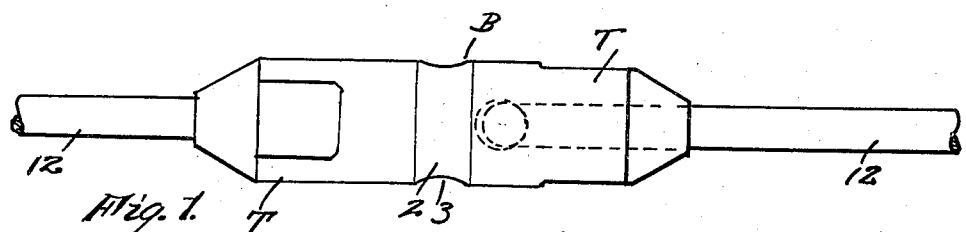
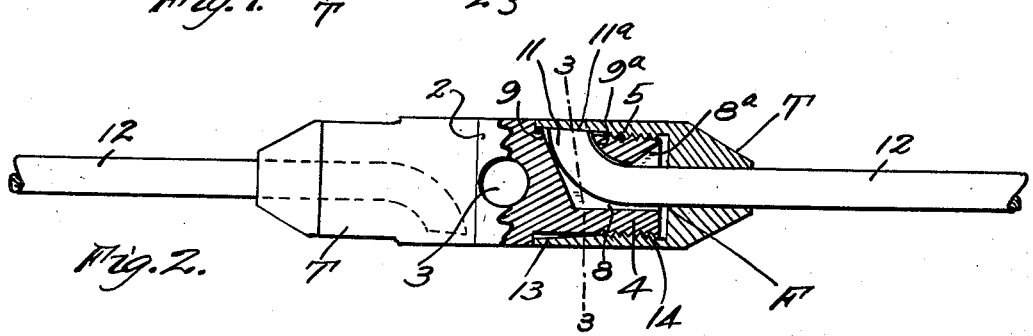
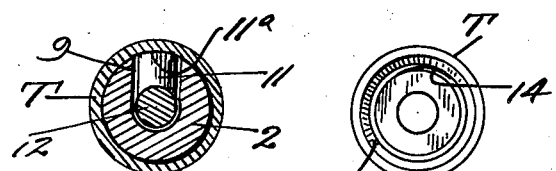 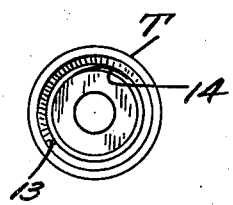
Inventor;
H. R. Crane,
By
Frederick E. Maynard
his Atty.

Patented Apr. 4, 1939

2,152,636

UNITED STATES PATENT OFFICE 2,152,636

ROD COUPLING ASSEMBLY

Hubert R. Crane, Los Angeles, Calif.

Application January 9, 1937, Serial No. 119,818

5 Claims. (Cl. 287—105)

This invention is a rod coupling assembly and is an improvement of the sleeve-type rod coupling illustrated in U. S. Patent No. 964,596, issued July 19, 1910.

Like that patent the present invention a body member provided with a lateral aperture into which is to be hooked the hooked end of a rod on which is slidable a collar or thimble to be screwed onto the threaded end of the body after the rod hook has been engaged in the lateral hole. A material advantage of such interlocking of the hook into the body per se is that if the collar should accidentally unscrew the rod would still, up to a considerable degree of lateral tilt, remain in hooked relation with the body. It is an object of the present invention to materially increase the safety or reliability of the interlock by elimination of the bottom recess 14 of the said Patent 964,596 and at the same time provide a body member entirely free of any elongated rod receiving slot cutting into the threaded end of the body, as shown at 11 in said patent.

Patent 1,990,721, of Feb. 12, 1935, shows a sleeve or tubular body (as in Patent 964,596) but including a plug 3 screwing into the sleeve 2 and serving as the sole means to center the rod in the large bore of the sleeve so that if the plug screws out of the body or sleeve the hook of the rod can at once shift off center enough to instantly unhook from the thin wall of the sleeve and allow the rod to disconnect from the coupling. An object of this invention is to provide a short, uninterrupted threaded portion close up to the hook receiving aperture of the body member and provide therein a centric opening complementary to the rod and leading to the lateral aperture to provide for worming of the hook end into the body member. This not only preserves the strength of the body end but materially increases the angle to which the coupled parts may relatively tilt, if the collar should screw out, before they separate.

An additional object of the invention is to provide a collar or nut part which is adapted to screw onto the coupler body and constitute a thimble covering the lateral hook receiving aperture and the inserted hook for the exclusion of abrasive material from the body pocket during use of the assembly, and, by such exclusion, prolonging the usefulness of the tool. And, in this connection, it is an object to provide a chuck-like function between the rod thimble and the rod end for the purpose of eliminating, to the most practical degree, any lost motion or play as between the thimble and the rod part, and, as well, between the rod, the thimble and the body member. More definitely, an object is to provide means effecting a flexing reaction directly between the thimble and its axially supported rod so as to bind one to the other, and at the same time to constitute a nut-lock action of the threaded thimble on the coupler body.

The invention consists in certain advancements in the rod coupling art as set forth in the ensuing disclosure and having, with the above, additional objects and advantages as hereinafter developed, and whose construction, combination and details of means, and the manner of operation will be made manifest in the annexed illustrative embodiment; it being understood that modifications, variations and adaptations may be resorted to within the scope, principle and spirit of the invention as it is more directly claimed in the appendage.

Figure 1 is a side elevation of a two-rod, joint assembly.

Figure 2 is a partial, axial section of the assembly.

Figure 3 is a transverse section on line 3—3, of Fig. 2.

Figure 4 is an elevation of the chuck end of the thimble.

The assembly includes a main body B on each end of which there is a substantially duplicate nut part in the form of a thimble T.

The body includes a hub 2, of cylindrical or other form having a through hole 3 for ready insertion of a pin or other device to conveniently hold it against rotation during attachment of a rod end to the body B; though other means may be employed for this function. From each end of the hub 2 extends a reduced, uninterrupted, threaded neck 4; the threads 5 of which extend close up to a lateral aperture 9 whose face 9ᵃ is undercut and intersects with the axial bore 8 of the threaded neck 4 and forming a substantially right-angle pocket complementary to a short, right-angle, end bend 11 of a rod section 12, Fig. 2, which is to be firmly attached to the coupling body B. The end bore 8 has one side of its outer end laterally widened at 8ᵃ to facilitate worming the hook 11 of the rod 12 into place in the centering, axial bore 8.

It will be noticed, Fig. 2, that the face or end facet 11ᵃ of the rod lies slightly outward beyond the threads 5 of the neck 4 and is here shown as conically bevelled complementally to the inner, conical surface 13 of the inner end of the thimble T which has good sliding and turning fit on its rod shank 12 and has bore threads 14 to screw onto the neck 4 of the body B. The outer end of the thimble provides a firm, close bearing for the rod shank 12 whose hook end considerably overhangs from the inner shoulder which forms a fulcrum F as to which the hook end tends to bend down or flex the rod axis as the chuck surface 13 comes into wedging engagement with the opposed, inclined facet 11ª of the hook end.

As the thimble T is screwed up firmly into place the hook 11 is sustained against rotation with the thimble by the supporting side wall of the lateral aperture 9. The great force set up by the wedge action of the thimble-chuck 13 flexes the overhanging end of the rod in the neck pocket 8—9 and binds the rod shank between the fulcrum F and the outer edge of the boring in the thimble end, so that the thimble and the rod become, in effect, a unitary part. At the same time the reaction on the mutually threaded parts 5—14 is such as to form a nut-lock resistance to accidental unscrewing of the assembly.

Couplings of this type are particularly useful in flexible sewer rod cleaning apparatus, and in this field the inner bearing surfaces of the coupled parts are greatly protected by the closure of the lateral pocket openings 9 by the novel thimble T here disclosed which precludes circulation of silt bearing liquid through the hook pockets in the body B. The extremely small interstice formed around the rod shank 12 in its bearing bore at the outer end of the thimble will choke and thus further seal the body pocket; of which it is understood that there is one at each end of the body B, in diagonally opposite relation. While the body B may be bored from end to end, as in the sleeve 8 of Patent No. 964,596, the closed body-form is here shown, as it prevents entry of fluid from the cross-hole 3.

The bore 8 is of sufficient diameter to permit of the desired amount of deflection of the hook end of the rod on the fulcrum 8, and yet small enough to effectively retain the rod and body in hooked relation, safely within such degree of bend of angle in a sewer as in ordinary adoption, in event that the thimble should possibly work backward or off the body B; this advantage being gained by the close, but clearing, bore 8 of the close-up, uninterrupted, threaded neck 4. It will be understood that if the neck 4 were merely laterally slotted from its axis outward to form a bed in which the hook end could be laterally sunk then in event the thimble should back off the neck threads—the hook would be free to slide unrestrained out of the body recess.

What is claimed is:

1. A rod coupling assembly including a body member, adapted for application of a turning tool, and having a threaded end having a rod entrance bore and a lateral aperture therefrom forming a hook-shaped pocket, a rod having a hook end insertible into the pocket, and a collar slidable and turnable on the rod and screwing onto the body and telescoping over the hook end of the rod and having internal means binding on the rod hook to hold it rigidly in place in the lateral hole.

2. In a rod coupling device, a hook-ended rod and a body into which it interhooks, and a thimble movable along the rod shank and attaching to the said body and having a portion to move over and reactively jamb on the end facet of the rod hook.

3. In a rod coupling assembly, a hook-ended rod and a body member in which it interhooks, and a thimble movable on the rod and attaching to the body and having a chuck-forming portion binding on the end facet of the rod hook, said end facet of the rod inclining rearwardly toward the axis of the rod.

4. A rod coupling assembly including a body member having a rod-end receiving pocket, a hook-ended rod complementary to the pocket, and a thimble movable on the rod shank and having threaded engagement with said member, and chuck means for binding the rod and the thimble in mutual relation; said means including engaging, inclined portions on said rod and said thimble, forming a wedge reaction to bind the parts together.

5. In a rod coupling assembly, a hook ended rod, a thimble closely but slidably fitting the rod and presenting an internal, annular shoulder, said hook end of the rod and the bore of the thimble having mutually engaging wedge parts whereby to bind one on the other and cause a flexure of the rod on the said shoulder, and a body member having a lateral hole for the hook and onto which body the thimble is threaded.

HUBERT R. CRANE.